(12) United States Patent
Woods et al.

(10) Patent No.: US 11,633,688 B2
(45) Date of Patent: Apr. 25, 2023

(54) HEPA AIR FILTRATION WITH AN AIR HANDLING DEVICE

(71) Applicant: AMERICAIR CORPORATION, Mississauga (CA)

(72) Inventors: Jim Woods, Mississauga (CA); Juan Valle, Brampton (CA); Gregory Inns, Oakville (CA); Tim Snelgrove, Mississauga (CA)

(73) Assignee: AMERICAIR CORPORATION, Mississauga (CA)

( * ) Notice: Subject to any disclaimer, the term of this patent is extended or adjusted under 35 U.S.C. 154(b) by 0 days.

(21) Appl. No.: 17/740,672

(22) Filed: May 10, 2022

(65) Prior Publication Data
US 2022/0266187 A1 Aug. 25, 2022

Related U.S. Application Data

(63) Continuation of application No. 16/714,225, filed on Dec. 13, 2019, now Pat. No. 11,364,460.

(60) Provisional application No. 62/779,671, filed on Dec. 14, 2018.

(51) Int. Cl.
| | |
|---|---|
| *B01D 46/46* | (2006.01) |
| *B01D 46/44* | (2006.01) |
| *F24F 11/74* | (2018.01) |
| *F24F 8/10* | (2021.01) |
| *F24F 13/04* | (2006.01) |
| *F24F 110/20* | (2018.01) |
| *F24F 110/70* | (2018.01) |
| *F24F 110/10* | (2018.01) |

(52) U.S. Cl.
CPC .......... *B01D 46/46* (2013.01); *B01D 46/446* (2013.01); *B01D 46/448* (2013.01); *F24F 8/10* (2021.01); *F24F 11/74* (2018.01); *F24F 13/04* (2013.01); *B01D 2279/51* (2013.01); *F24F 2110/10* (2018.01); *F24F 2110/20* (2018.01); *F24F 2110/70* (2018.01)

(58) Field of Classification Search
CPC .... F24F 8/10; F24F 11/74; F24F 13/04; F24F 2110/10; F24F 2110/20; F24F 2110/70; B01D 46/46; B01D 46/446; B01D 46/448; B01D 2279/51; B01D 46/0036; B01D 46/2411; B01D 46/58
See application file for complete search history.

(56) References Cited

U.S. PATENT DOCUMENTS

| | | | |
|---|---|---|---|
| 3,945,432 A * | 3/1976 | Tamblyn | F24F 3/00 165/218 |
| 5,193,610 A | 3/1993 | Morissette et al. | |
| 5,292,280 A | 3/1994 | Janu et al. | |
| 6,209,622 B1 | 4/2001 | Lagace et al. | |
| 6,855,050 B2 | 2/2005 | Gagnon et al. | |
| 7,635,296 B2 | 12/2009 | Gagnon et al. | |
| 7,658,671 B2 | 2/2010 | Balzo et al. | |

(Continued)

OTHER PUBLICATIONS

Lennox, Homeowners IAQ Guide for Pureair Models PCO-12C, PCO-20C, published in 2001; 4 pages.

*Primary Examiner* — Nelson J Nieves
(74) *Attorney, Agent, or Firm* — Roach Brown McCarthy & Gruber, P.C.; Kevin D. McCarthy

(57) ABSTRACT

A HEPA/VOC air handling system having a HEPA air filtration unit, an air handling unit, a fresh air sensor system, a return air sensor system, an air handling air sensor, and a controller.

19 Claims, 10 Drawing Sheets

(56) References Cited

U.S. PATENT DOCUMENTS

| | | |
|---|---|---|
| 8,550,888 B2 | 10/2013 | Hildreth, Jr. et al. |
| 9,546,786 B2 | 1/2017 | Hokanson |
| 9,581,355 B2 | 2/2017 | Boros et al. |
| 10,041,743 B2 | 8/2018 | Heberer et al. |
| 10,161,631 B2 | 12/2018 | Hokanson |
| 10,222,085 B2 | 3/2019 | Heberer et al. |
| 10,240,787 B2 | 3/2019 | Hokanson |
| 10,436,476 B2 | 10/2019 | Boros et al. |
| 11,105,526 B1 | 8/2021 | Anderson et al. |
| 2005/0252229 A1* | 11/2005 | Moratalla ............... B01D 53/26 62/271 |
| 2007/0101688 A1 | 5/2007 | Wootton et al. |
| 2012/0006526 A1* | 1/2012 | Niazi ..................... C12M 27/16 165/59 |
| 2016/0282000 A1 | 9/2016 | Noh et al. |
| 2017/0276399 A1 | 9/2017 | Huseman et al. |
| 2018/0224145 A1 | 8/2018 | Tajima et al. |
| 2019/0128545 A1 | 5/2019 | Horng et al. |
| 2020/0103127 A1 | 4/2020 | Chen et al. |

\* cited by examiner ically particulate air/volatile organic compounds air filtration unit (commonly referred to as a HEPA/VOC device and collectively referred to as HEPA in this application) being used in association with an air handling device for the manipulation and control of air in an enclosure. The enclosure can be, for example, a building, a room within the building, or similar enclosed environments, wherein it is desirable or required to control the air temperature, air humidity and air contaminants in the enclosure.

HEPA AIR FILTRATION WITH AN AIR HANDLING DEVICE

PRIORITY CLAIM

This application claims priority to U.S. provisional patent application Ser. No. 62/779,671 filed on Dec. 14, 2018.

TECHNICAL FIELD OF THE INVENTION

The present invention relates to a high-efficiency particulate air/volatile organic compounds air filtration unit (commonly referred to as a HEPA/VOC device and collectively referred to as HEPA in this application) being used in association with an air handling device for the manipulation and control of air in an enclosure. The enclosure can be, for example, a building, a room within the building, or similar enclosed environments, wherein it is desirable or required to control the air temperature, air humidity and air contaminants in the enclosure.

BACKGROUND OF THE INVENTION

At U.S. Pat. No. 6,855,050; Gagnon wrote, "Such air handling systems (e.g. ventilation apparati or systems) may for example include an element for the transfer of heat from warm exhaust air (taken from inside an enclosure e.g. a building) to cooler exterior fresh air (drawn into the enclosure e.g. building). Air handling systems (e.g. ventilation systems and apparati) may not only exhaust stale interior air to the outside of an enclosure but as desired or necessary also intermingle a portion of such stale air with fresh air for delivery of the intermingled air back into the enclosure (during cold or warm weather).

Heat recovery ventilation systems are known whose function is to draw fresh exterior air into a building and to exhaust stale interior air to the outside. The systems are provided with appropriate ducting, channels and the like which define a fresh air path and an exhaust air path whereby with the interior air of a building and the exterior ambient air may be exchanged; during ventilation the air in one path is not normally allowed to mix with the air in the other path . . . .

Heat recovery ventilation devices may also have a housing or cabinet; such enclosures may for example be of sheet metal construction (e.g. the top, bottom, side walls and any door, etc. may be made from panels of sheet metal). The heat exchanging element(s), as well as other elements of the device such as, for example, channels or ducts which define air paths, filtration means, insolation and if desired one or more fans for moving air through the fresh air and exhaust air paths may be disposed in the enclosure. Such ventilation devices may be disposed on the outside of or within a building such as a house, commercial building or the like; appropriate insulation may be provided around any duct work needed to connect the device to the fresh air source and the interior air of the building.

U.S. Pat. No. 5,193,610, for example, as well as U.S. Pat. No. 6,209,622 describe ventilation devices which exhaust stale inside air from a structure such [as] a house while delivering fresh outside air to the interior of the building; the entire contents of each of these patents is incorporated herein by reference. . . . [It] is known to exhaust stale interior air of an enclosure to the outside of the enclosure. It is also known to intermingle stale exhaust air of an enclosure with fresh air for delivery of the intermingled air back into the enclosure; the intermingled air prior to delivery back to the enclosure may as desired or necessary be subjected to one or more treatment stages such as for example a filtration stage, a heat transfer stage, etc. A disadvantage of such known intermingling systems or apparati is that the entire stale exhaust air flow stream is intermingled with a fresh air flow stream to obtain an intermingled air flow of greater volume than that of the initial exhaust air flow; it is this greater volume of intermingled air that is then subjected to a filtration stage. The so treated (i.e. filtered) air is then split into a first portion for delivery back to the enclosure and a second portion for exhausting to the exterior of the enclosure. A drawback of such a known system is that the air exhausted outside the enclosure (e.g. dwelling) has been subjected to a filtration treatment stage, a heat transfer stage, etc. before exhaustion. This reduces the efficiency of a filtering/heat transfer/purifying capability of the system for the enclosure (e.g. dwelling).

It would be advantageous to have a ventilation method, system, apparatus or the like which avoids the exhausting of a portion of treated air (e.g. filtered, heat treated, etc.) to the exterior of an enclosure.

Ventilation systems and devices such as those shown in U.S. Pat. No. 5,193,610, as well as U.S. Pat. No. 6,209,622 are known to exploit damper systems which control the flow of air through the various ducts and channels thereof. Such known damper systems may exploit dampers which are actuated (i.e. displaced from one position or configuration to another position or configuration) by means of rigid (metal) link rod(s) driven by a motor arm mounted directly on a damper actuation motor. These systems require significant precision to work properly because a slight variation in rod or arm length may result in improper damper closure. More particularly, such damper systems are used to control pairs (i.e. two) of dampers which respectively may close off or open a fresh air path as well as contemporaneously opening or closing off a stale exhaust air path. If one of the dampers fails to completely close while the other is still open, this may result in an air leak, which may lead to ice buildup under certain cold weather operating conditions.

It would there for be advantageous to have a damper system which comprises a plurality [of] (i.e. two or more) dampers which are to be contemporaneously displaced which is self-aligning, i.e. if a damper closes before the other, an activation component will be able to continue to act on the unclosed damper until the second damper is fully closed.

It is also known that an ordinary ventilation unit, or system allowing air exchange with the exterior may cause discomfort like nose bleeding during the winter due to over-dryness of air. It would be advantageous to have a damper means, which may be used to overcome this situation, and which reacts to constrict the flow of air as a function of temperature variations around the damper. It would in particular be advantageous if such a damper could react without recourse to an external (electrical) power source, i.e. the damper movement would be a purely mechanical device . . . .

It is known for example to provide an air handling system which provides for the mixing of a cold (and possibly dry) air stream with a hot (and possibly humid) air stream. However, the intermingling or mixing of such streams may lead to the presence in the system of undesirable or unwanted water condensation and even snow or ice buildup; this is especially so if a cold/dry flow of air (exterior air) is merely brought into contact with a flow of high humidity warm/hot air (interior air such as from a dwelling) during winter conditions. On the opposite side a similar undesirable water buildup (i.e. a liquid or solid) may occur in an air handling system if fresh hot humid outside air is contacted with relatively cool stale dry inside air (i.e. hot summer conditions) . . . .

Referring to FIG. 1 [identified as prior art for this document], this figure illustrates a known integrated fresh air supply and exhaust air ventilator system which exploits an air flow pre-mixing stage 2 wherein a fresh air flow 4 drawn from outside of an enclosure (e.g. dwelling, not shown), is mixed with a stale air flow 6 drawn from within the enclosure so as to produce a resulting intermingled (i.e. a mixed) airflow 8 which as may be seen is a combination of the total of the stale and fresh air flows. The so obtained total intermingled (i.e. mixed) air flow 8 is then passed through an air filter or purifier stage 10 so as to obtain a filtered intermingled air flow 12.

After the air filtering/purifying stage the filtered intermingled air flow 12 is passed through a blower assembly 14 to an upstream air splitting stage 16 wherein the filtered intermingled air flow 12 is divided into an exhaust (treated-filtered) air flow portion 18 for exhaustion outside of the enclosure and a treated (i.e. filtered) air flow supply 20 for delivery into the enclosure (e.g. dwelling).

Although the illustrated ventilation system does introduce fresh air from outside of an enclosure into the enclosure, the main drawback with this known system is that part of treated (i.e. filtered) air is exhausted outside the enclosure (e.g. dwelling). This reduces the efficiency of the filtering/purifying capability of the system for the enclosure (e.g. dwelling).

Referring to FIG. 2 [identified as prior art for this document], this figure illustrates in schematic fashion a modified known integrated supply and exhaust ventilator system. There is a fresh air inflow 22 from the exterior of the enclosure and a stale air inflow 24 from the interior of the enclosure; there is also a treated air outflow 26 to the enclosure and an exhaust air outflow 28 to the exterior of the enclosure. The modified system includes a heat exchange or transfer stage 30, such as for example an air-to-air sensible heat exchanger and/or desiccant exchanger (i.e. for the air-to air transfer of water moisture and/or sensible heat). The system also exploits an air flow pre-mixing stage 32 wherein the heat treated fresh air flow 34 is mixed with the stale air flow 24 so as to produce a resulting intermingled (i.e. a mixed) airflow 36 which as may be seen is a combination of the total of the stale and fresh air flows. The so obtained total intermingled (i.e. mixed) air flow 36 is then passed through an air filter or purifier stage 38 so as to obtain a filtered intermingled air flow 40. After the air filtering/purifying stage the filtered intermingled air flow 40 is passed through a blower assembly 42 to an upstream air splitting stage 44 wherein the filtered intermingled air flow 40 is divided into an exhaust (treated-filtered) air flow portion 46 and the treated (i.e. filtered) air flow supply 26 for delivery into the enclosure (e.g. dwelling).

As may be seen the heat exchange or transfer stage 30 provides for a heat exchange or transfer between the fresh air inflow 22 and the exhaust air flow portion 46 to produce the heat treated outflow 28.

This type of known heat exchange system has a drawback in addition to the drawback discussed above with respect to the system illustrated in FIG. 1. The efficiency of this illustrated known heat exchange system is reduced since a portion of the fresh airflow is subjected to a second heat exchange treatment, namely, the portion of the fresh airflow associated with the exhaust air portion is again subjected to heat exchange prior to being exhausted.

Referring to FIG. 3 [identified as prior art for this document], this figure shows in schematic fashion an example embodiment of [an] integrated supply and exhaust ventilator system in accordance with the [disclosure in U.S. Pat. No. 6,855,050]. In general as may be seen the fresh air pre-mixing stage 48 and the stale air splitting stage 50 are both disposed downstream of the air filter or purifier stage 52. The system illustrated employs two blower assemblies 54 and 56 which are respectively disposed on the upstream sides of the fresh air pre-mixing stage 48 and stale air splitting stage 50; one or both of the blowers could of course be disposed on the downstream sides of the fresh air pre-mixing stage 48 and stale air splitting stage 50. Thus as may be seen a stale air flow stream 58 is delivered to the stale air splitting stage 50 which divides the air flow into an exhaust (untreated) air flow portion 60 for exhaustion (via a blower assembly 56) directly outside of the enclosure and a stale airflow portion 62 for delivery to the fresh air pre-mixing stage 48 wherein the fresh air flow 64 from outside of the enclosure is intermingled (e.g. mixed) with the stale airflow portion to provide an untreated intermingled (i.e. a mixed) airflow 68. The untreated intermingled (i.e. a mixed) airflow 68 is then passed through the air filter or purifier stage 52 so as to obtain a filtered intermingled (i.e. a mixed) airflow 70 which is then passed through the blower assembly 54 into the enclosure (e.g. dwelling). The fresh air premixing stage 48 and stale air splitting stage 50 may take any desired or known form; they may for example take the form of the air intermingling assembly as described [in the disclosure in U.S. Pat. No. 6,855,050].

An advantage with this new system is that the stale air is exhausted to the outside of the enclosure to outside without any prior air treatment. Additionally fresh air from outside is added to the stale air to be treated (i.e. filtered) just before the filter/purification process. Therefor only the necessary airflow is treated (i.e. filtered) prior distribution in the dwelling.

Referring to FIG. 4 [identified as prior art for this document], this figure illustrates in schematic fashion a modified version in accordance with the [disclosure in U.S. Pat. No. 6,855,050] of the integrated supply and exhaust ventilator system as shown in FIG. 3. There is a fresh air inflow 72 from the exterior of the enclosure and a stale air inflow 74 from the interior of the enclosure; there is also a treated air outflow 76 to the enclosure and a heat treated exhaust air outflow 78 to the exterior of the enclosure. The modified system includes a heat exchange or transfer stage 80, such as for example an air-to-air sensible heat exchanger and/or desiccant exchanger (i.e. for the air-to air transfer of water moisture and/or sensible heat). The system has a fresh air pre-mixing stage 82 and a stale air splitting stage 84 which are both disposed downstream of the air filter or purifier stage 86. The system illustrated employs two blower assemblies 88 and 90 which are respectively disposed on the upstream sides of the fresh air pre-mixing stage 82 and stale air splitting stage 84. Thus as may be seen the stale air flow stream 74 is delivered to the stale air splitting stage 84 which divides the air flow into an exhaust (untreated) air flow portion 92 and a stale airflow portion 94. The air flow portion 92 is delivered to the heat exchange or transfer stage 80 for heat transfer with the fresh air inflow 72 to produce the heat treated exhaust air outflow 78 which is exhausted (via a blower assembly 88) outside of the enclosure. The stale airflow portion 94 is delivered to the fresh air pre-mixing stage 82 wherein the heat treated fresh air flow 96 from the heat exchange or transfer stage 80 is intermingled (e.g. mixed) with the stale airflow portion 94 to provide an intermingled (i.e. a mixed) airflow 98. The intermingled (i.e. a mixed) airflow 98 is then passed through the air filter or purifier stage 86 so as to obtain the filtered intermingled (i.e. a mixed) airflow 76 which is then passed through the blower assembly 90 into the enclosure (e.g. dwelling). The fresh air pre-mixing stage 82 and stale air splitting stage 84 may take any desired or known form; they may for example take the form of the air intermingling assembly as described herein.

As may be seen in accordance with the system shown in FIG. 4, the fresh air flow is first directed to the heat exchange or transfer stage and the heat treated fresh air flow leaving the heat exchange stage is directed to the pre-mixing stage whereas the untreated (i.e. unfiltered) exhaust stale air flow portion prior to exhaustion outside of the enclosure (e.g dwelling) is directed to the heat exchange or transfer stage and the heat treated exhaust stale air flow portion is then directed outside of the enclosure (e.g. dwelling).

[According to Gagnon et al., an] additional advantage with [the FIG. 4 (prior art)] system is improved efficiency since fresh airflow is not subjected to a further heat exchange through the sensible heat exchanger and/or desiccant exchanger stage as part of the exhausted air, i.e. which is the case for the system shown in FIG. 2 [(prior art)]. Thus the size of the sensible heat exchanger or desiccant exchanger may be reduced as compared to the system depicted in FIG. 2" (prior art).

The above-identified prior art single phase fresh air and return air systems are known and acknowledged to be deleterious to a HEPA air filter system since water condensation, ice, snow or water buildup are known problems with such single phase mixing. The present invention addresses those above-identified problems so a HEPA air filter system can be used effectively with fresh air conditions.

SUMMARY OF THE INVENTION

A HEPA air filtration unit interconnects to an air handling device wherein collectively the HEPA air filtration unit and air handling device, as managed by a controller, delivers filtered conditioned air to a room. The room can be a conventional room, a building, or an area that filtered conditioned air is desirable or required.

The HEPA air filtration unit and the air handling device are able to receive return air, wherein return air is (a) air that was previously used in the above-identified room and (b) directed to the HEPA air filtration unit and the air handling device through return duct work(s). The HEPA air filtration unit, which contains a HEPA filter system, also receives fresh air. Prior to entering the HEPA air filtration unit, multiple air characteristics regarding both the fresh air and the return air are measured and those measurements are transmitted to a controller. After evaluating those measurements in relation to first predetermined threshold values and preferably second predetermined threshold values, the controller adjusts the opening or closing of (a) a fresh air damper, (b) a return air damper and (c) a return duct damper. The fresh air damper and the return air damper operate independently of each other and the controller permits desired quantities of the respective fresh air and return air into a first chamber of the HEPA air filtration unit through the fresh air damper and the return air damper. In contrast, the return duct damper is opened and closed to control the volume of return air that can pass through the return air damper in order to avoid, at least, over-pressurizing the room or the first chamber. The return duct damper can also direct return air toward the environment outside the HEPA air filtration unit and the air handling device.

Returning to the fresh air and the return air entering the first chamber, the desired quantities of fresh air and return air that enter the first chamber are calculated by the controller to permit the fresh air and the return air that enters the first chamber to mix and hopefully achieve at least first predetermined threshold values when the mixed air is measured in the first chamber. Thereby, ice and water formation in the first chamber are decreased since the first predetermined threshold values are set to decrease the formation of ice or water forming in the first chamber when the fresh air and the return air are mixing in the first chamber. That way, the HEPA air filtration unit and the air handling device can be effectively used in various climates—comfortable all-season climates like Mississauga, Ontario; unbearable hot summer climates like Dallas, Tex. or Phoenix, Ariz.; or enjoyable and invigorating winter climates like Big Sky, Mont. or Banff, Alberta—and not damage the HEPA air filtration unit or the air handling device with water formation or ice formation in the first chamber.

While in the first chamber, a first chamber sensor system measures the mixed air's air characteristics and those measurements are transmitted to the controller. The controller evaluates those first chamber air characteristic measurements in relation to the first predetermined threshold values and preferably second predetermined threshold values in order to determine if the mixed air can pass through the HEPA filter system. In response, the controller adjusts the opening or closing of (a) a HEPA damper that permits desired quantities of mixed air to enter the HEPA filter system and (b) a first chamber exhaust damper that permits desired quantities of mixed air to exhaust toward the environment outside the HEPA air filtration unit and the air handling device.

Once filtered, the air is directed into the air handling device. Like the HEPA air filtration unit, the air handling device has a sensor system that measures air characteristics. When the air characteristics in the air handling device meet the second predetermined threshold values, which are preferred air characteristics—in relation to the first predetermined threshold values —, the air handling device permits the air to be delivered to the room through at least a duct work.

DESCRIPTION OF THE DRAWINGS

For a more complete understanding of the present invention and the advantages thereof, reference is now made to the following description taken in conjunction with the accompanying Drawings in which

FIG. 8 illustrates a schematic of the current invention.

DETAILED DESCRIPTION OF THE INVENTION

Americair, Inc., the assignee of this application, manufactures many high-efficiency particulate air ("HEPA") air filtration devices 100. Its conventional HEPA air filtration devices 100 are designed to filter (a) air passing through a return air duct, (b) air passing through a conditioned air (air that is heated or cooled) duct, or (c) ambient air in a room. Americair's HEPA air filtration devices 100 were not designed to treat fresh air.

Figure 1:
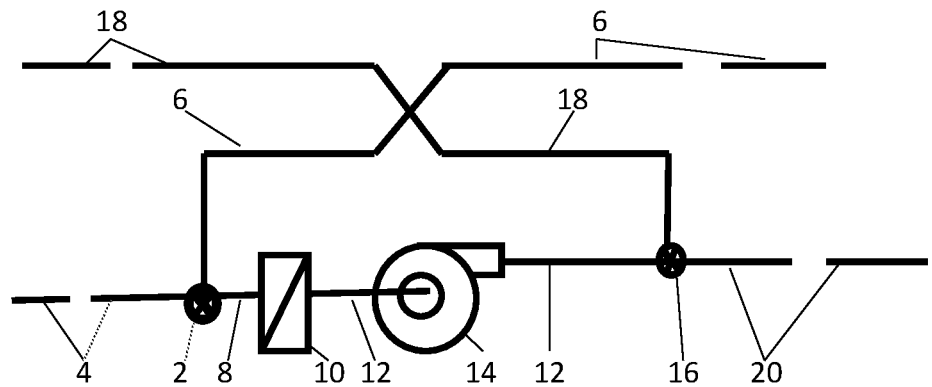
FIG. 1 is a prior art schematic illustration of airflow through a known integrated supply and exhaust ventilator system or apparatus without sensible heat exchanger or desiccant exchanger (i.e. without any transfer of water moisture and sensible heat)
Figure 2:
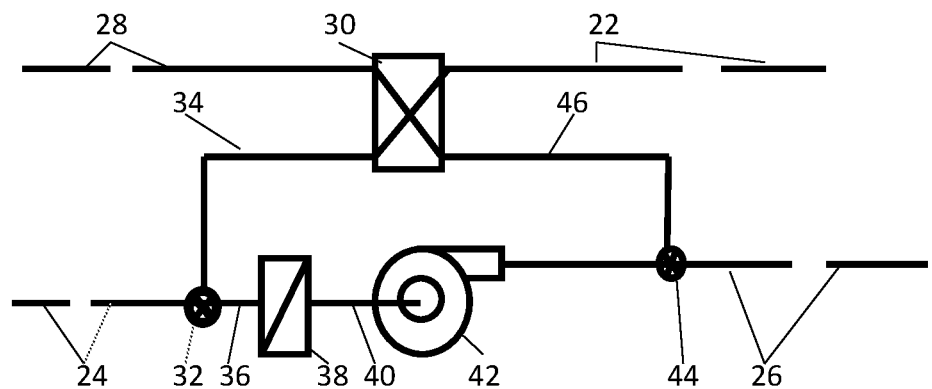
FIG. 2 is a prior art schematic illustration of airflow through a known integrated supply and exhaust ventilator system or apparatus with sensible heat exchanger and/or desiccant exchanger (i.e. with transfer of water moisture and sensible heat)
Figure 3:
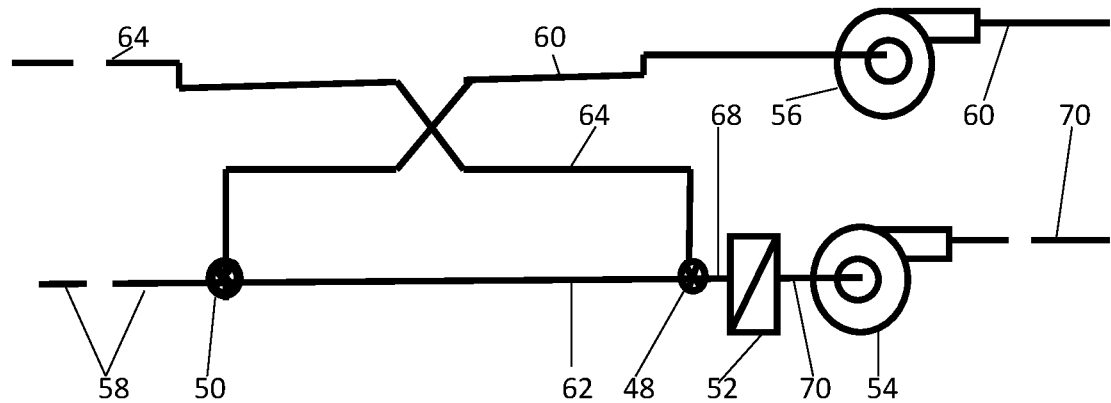
FIG. 3 is a prior art schematic illustration of airflow through a known embodiment of an integrated supply and exhaust ventilator system or apparatus without sensible heat exchanger or desiccant exchanger (i.e. transfer of water moisture and sensible heat)
Figure 4:
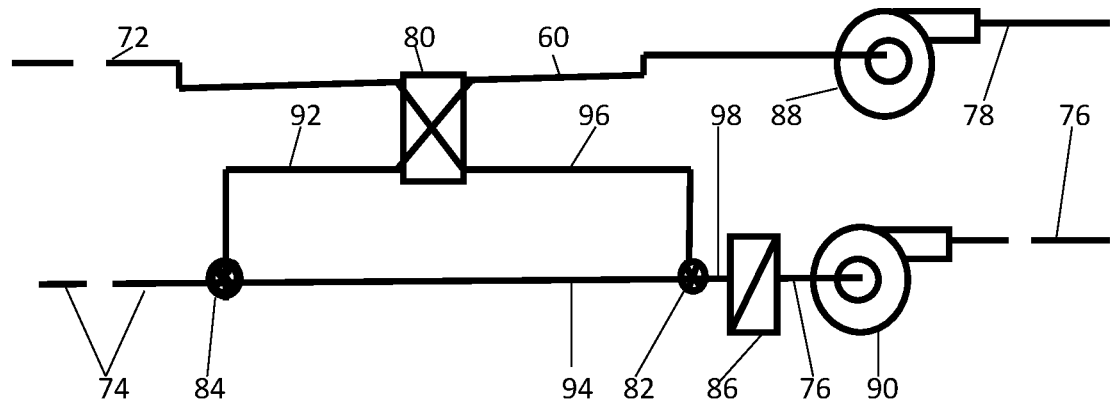
FIG. 4 is a prior art schematic illustration of airflow through a known embodiment of an integrated supply and exhaust ventilator system or apparatus with sensible heat exchanger and/or desiccant exchanger (i.e. with transfer of water moisture and sensible heat)
Figure 5:
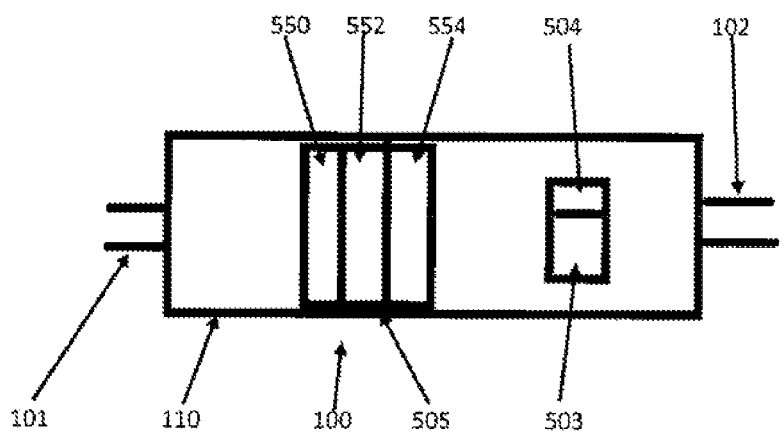
FIG. 5 is a prior art schematic of a HEPA filter system.

As illustrated at FIG. 5, each of Americair's conventional HEPA air filtration device 100 has a housing 110. The housing 110 has an indoor air inlet 101, an air outlet 102, and a HEPA filter system 505 positioned (A) between the indoor air inlet 101 and the air outlet 102 and (B) so the air that enters the indoor air inlet 101 must pass through the HEPA filter system 505. The air outlet 102 could direct the filtered air into a room as illustrated at FIG. 5, a return air duct, or a conditioned air duct.

In many instances, the housing 110 has a fan 503 and a motor 504 positioned after the HEPA filter system 505 as illustrated at FIG. 5 or prior to the HEPA air filter system 505. The fan 503 can also be positioned in ductwork (return or conditioned) after the air outlet 102 (see, FIG. 6) or prior to the air inlet 101 (see, FIG. 7). In these embodiments, the fan/motor 503, 504 pulls or pushes air through (a) the HEPA air filtration device's indoor inlet, (b) the air outlet 102 and (c) the HEPA filter system 505. When the fan 503 is positioned in the HEPA air filtration unit 100, the fan's motor is, preferably, an EC motor. An EC motor means the motor is electronically commutated which basically conveys it is a fan with a brushless DC motor. That fan/motor (a) controls the building's air pressure and (b) provides constant (relatively) air pressure at a desired air pressure. The air pressure is monitored, as explained below, through air pressure sensors (a) positioned in the building, the duct work and the air controlling devices 119 and 200 and (b) interconnected to a controller 109. The controller 109 also controls the fan/motor 503 to control the movement of air through the building and the air controlling devices 119 and 200.

Figure 6:
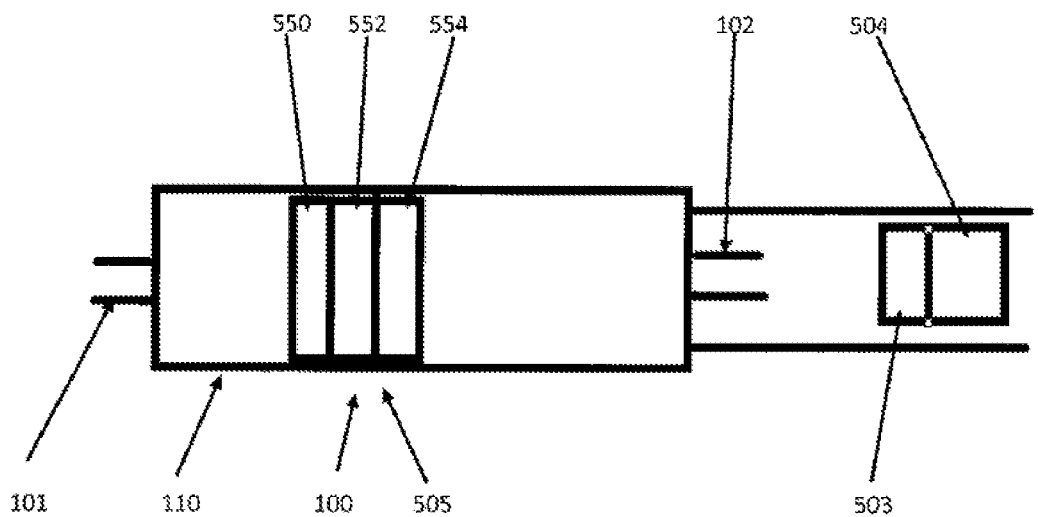
FIG. 6 is a prior art schematic of a HEPA filter system.
Figure 7:
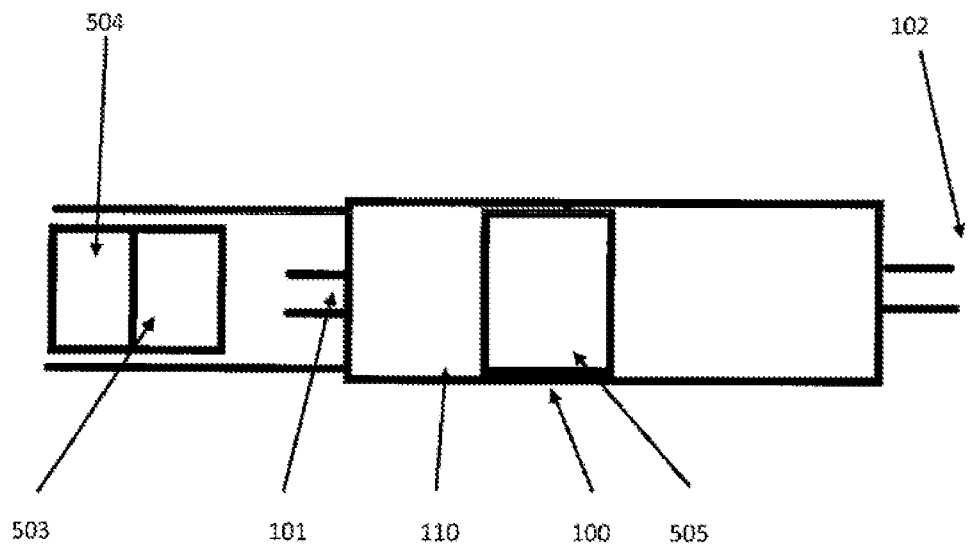
FIG. 7 is a prior art schematic of a HEPA filter system.

The HEPA filter system 505, as illustrated at FIGS. 5, 6 and 7, includes (a) a foam pre-filter 550 that removes larger particulates such as dust and dander from the air passing through, (b) a high efficiency particulate removal filter media 552 that is laser tested to remove 99.97% of the particles in the air stream down to a size of 0.3 microns— particles of concern which are normally in this size range include pollen, household dust, cigarette smoke, bacteria, molds, etc.; and, optionally, (c) an inner blanket 554 (which can be like ½ inch) of activated carbon impregnated with non-woven polyester filter material which absorbs additional gaseous contaminants such as odors and toxic fumes. In the HEPA air filtration housing 500, the air inlet is positioned prior to the HEPA filter system 505 and the air outlet 102 is positioned after the HEPA filter system 505 as illustrated at FIGS. 5, 6 and 7.

In particular, one version of Americair's HEPA air filtration devices 100 is an AIRWASH® air filtration device. The AIRWASH® air filtration device can cleanse up to 1,000 cubic feet of air per minute. The applicant conducted a particulate study that compared the number of particulates in a 15'×30' room prior to operating its AIRWASH® air filtration device (referred to as "Ambient Room") and after its AIRWASH® air filtration device operated for 20 minutes (referred to as "20 min Operating"), wherein the particle reader, identified above, was positioned on a conventional end table in the middle of the room. The results were as follows:

| Condition | Particle Count |
| --- | --- |
| Ambient Room | 297,400 |
| 20 min Operating | 166,400 |

As indicated above, Americair Corporation manufactures numerous types of air filtration devices and corresponding HEPA filter systems. Its HEPA air filtration devices (and units when connected to an air handling device) are in large, medium or small housing structures that utilize corresponding sized HEPA filter systems. Its air filtration devices sometimes require tools to insert and replace HEPA filter systems. Americair also manufactures a threaded HEPA filter housing structure for one of its HEPA filter systems by having an EasyTwist brand threaded end cap.

That threaded HEPA filter system has a threaded end cap at one end, a HEPA air filter section (pre-filter and HEPA filter and optional inner blanket) and a second end cap at the other end. The threaded end cap has an aperture, essentially positioned in the center of the threaded end cap, with a wall extending in a direction toward the second end cap. The wall has the threaded area of the threaded end cap.

The threaded area releasably engages with a corresponding threaded protrusion of an air filtration device's housing bulkhead. In one embodiment, a filter O-ring is positioned around the threaded protrusion, thereby the O-ring creates an air-tight seal between the threaded end cap and the bulkhead when the two components are properly positioned together. That air-tight seal is designed to inhibit air in the air filtration device from bypassing the filter.

The bulkhead, preferably, has an opening within an area defined by or encircling the threaded protrusion. That bulkhead opening directs air into or out of the HEPA air filter and/or the air outlet, depending on the air flow's direction, to obtain the desired air quality after the air passes through the HEPA air filtration system.

Figure 11:
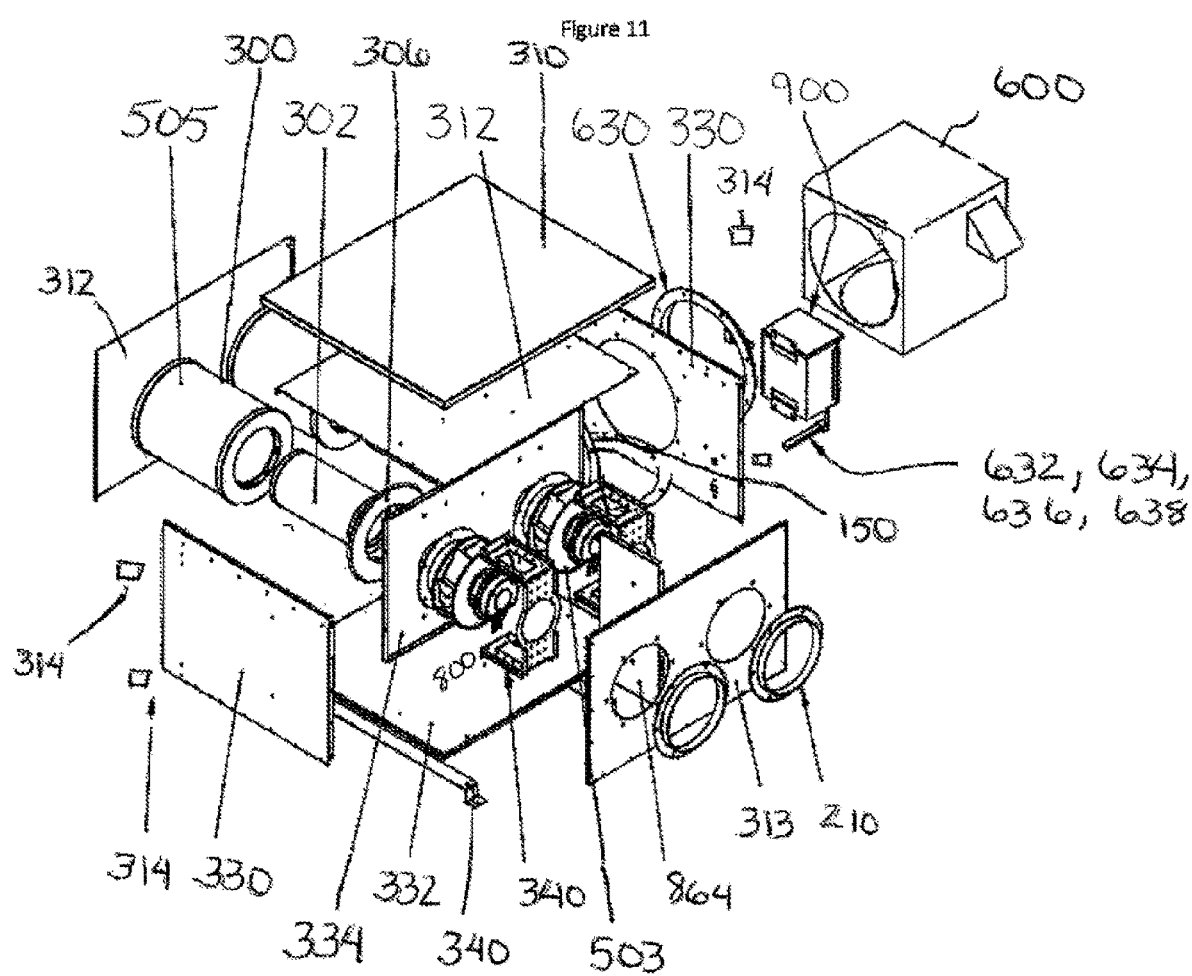
FIG. 11 illustrates an exploded view of FIG. 10.
Figure 12:
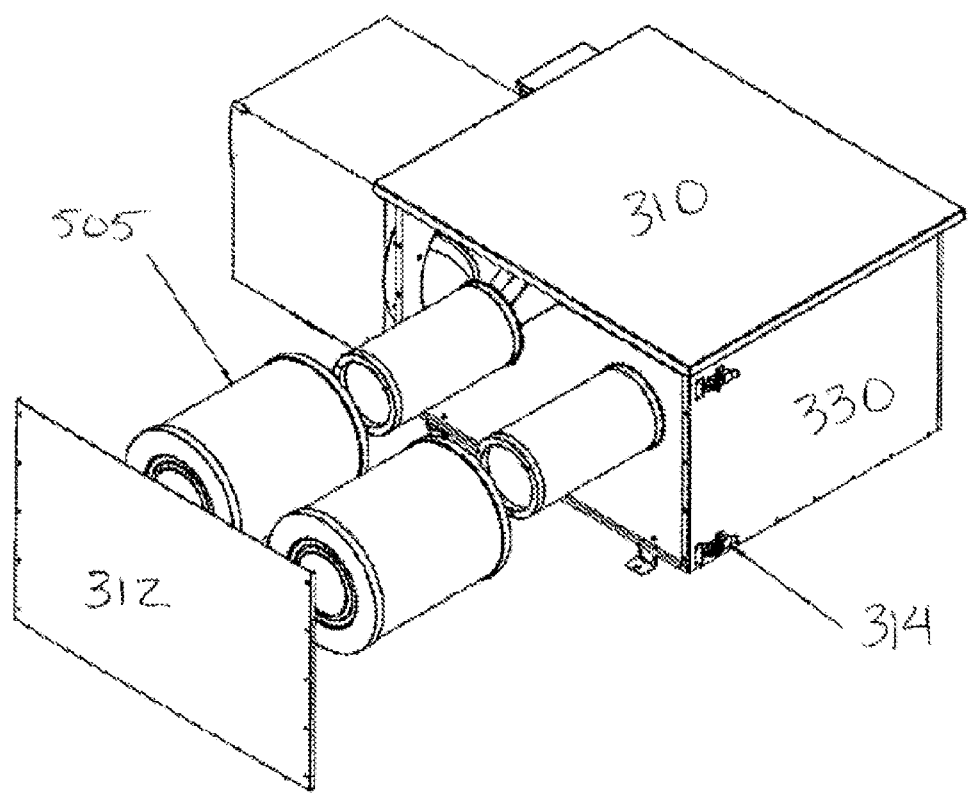
FIG. 12 illustrates FIG. 10 with a removable back wall.
Figure 13:
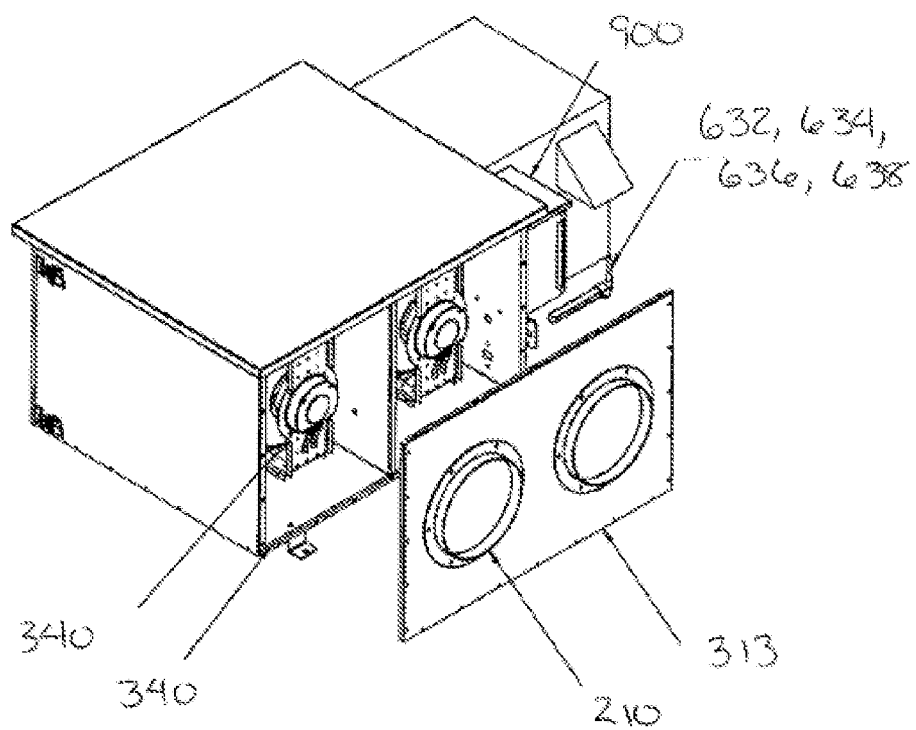
FIG. 13 illustrates FIG. 10 with a removable front wall.

Americair's threaded HEPA air filtration system has the following characteristics:
  Cylindrical Perfect Seal 2-Stage Cartridge (13" Diameter×16" Height) (see, FIG. 11, 300)
    Stage One: ⅛" Foam Prefilter
    Stage Two: Granulated Carbon pellets encased in steel mesh canister (see, FIG. 11, 302) (9475 g=10,422,500 m² adsorption surface area)
    Optional Stage Two: 100 sq. ft. Pleated Easy Twist HEPA Cartridge (see, FIG. 11, 306)

Optional Stage Three: Granulated Carbon pellets encased in steel mesh canister (1550 g=1,705,000 m² adsorption surface area)

In its manuals that describe how to install the threaded HEPA filter in an Amaircare® brand air filtration device, Americair wrote, "With the filters changed or inspected, all 3 filters are ready to be placed back into the unit. Place the HEPA cartridge gently into the unit (if a carbon canister is being used, take care not to let it slide out as it is heavy and could damage the unit.) When the HEPA cartridge is in place, brace the unit, press down and gently turn its clockwise to lock it into place. If too much force is used, the cartridge may be difficult to remove! Replace the HEPA filter access panel. Re-install safety screw(s) into HEPA filter access panel."

As previously indicated, Americair's HEPA air filtration devices 100 and in particular Americair's HEPA filter system 505 normally do not filter fresh air due to increased fluctuation in fresh air's humidity and temperature that (a) can severely damage the HEPA filter system 505 and (b) are not present in room/building ambient air. That being said, it is recognized that filtering fresh air prior to being conditioned by an air handling device 200 that heats the air, maintains the ambient air temperature, cools the air, and controls the humidity of a building's air is desirable since a HEPA filter system removes 99.97% of the particles in the air greater than 0.3 microns. Removing air particles inhibits damaging the air handling device 200 and simultaneously cleans the air. As indicated in the background of the invention, filtering fresh air prior to entering an air handling device 200 is known. Filters used in the background of the invention would normally not meet HEPA standards if the fresh air (a) was below 5° C., (b) was above 30° C., or (c) contained too much humidity due to the above-identified humidity and temperature problems that damage HEPA filter systems 505.

To address the above-identified problems, the air inlet 101 in the HEPA air filtration device 100 has been altered to form a dual inlet HEPA air filtration system 119, and an adjustable damper system, wherein each damper operates independently of each other damper to obtain the desired results, has been installed.

Figure 8:
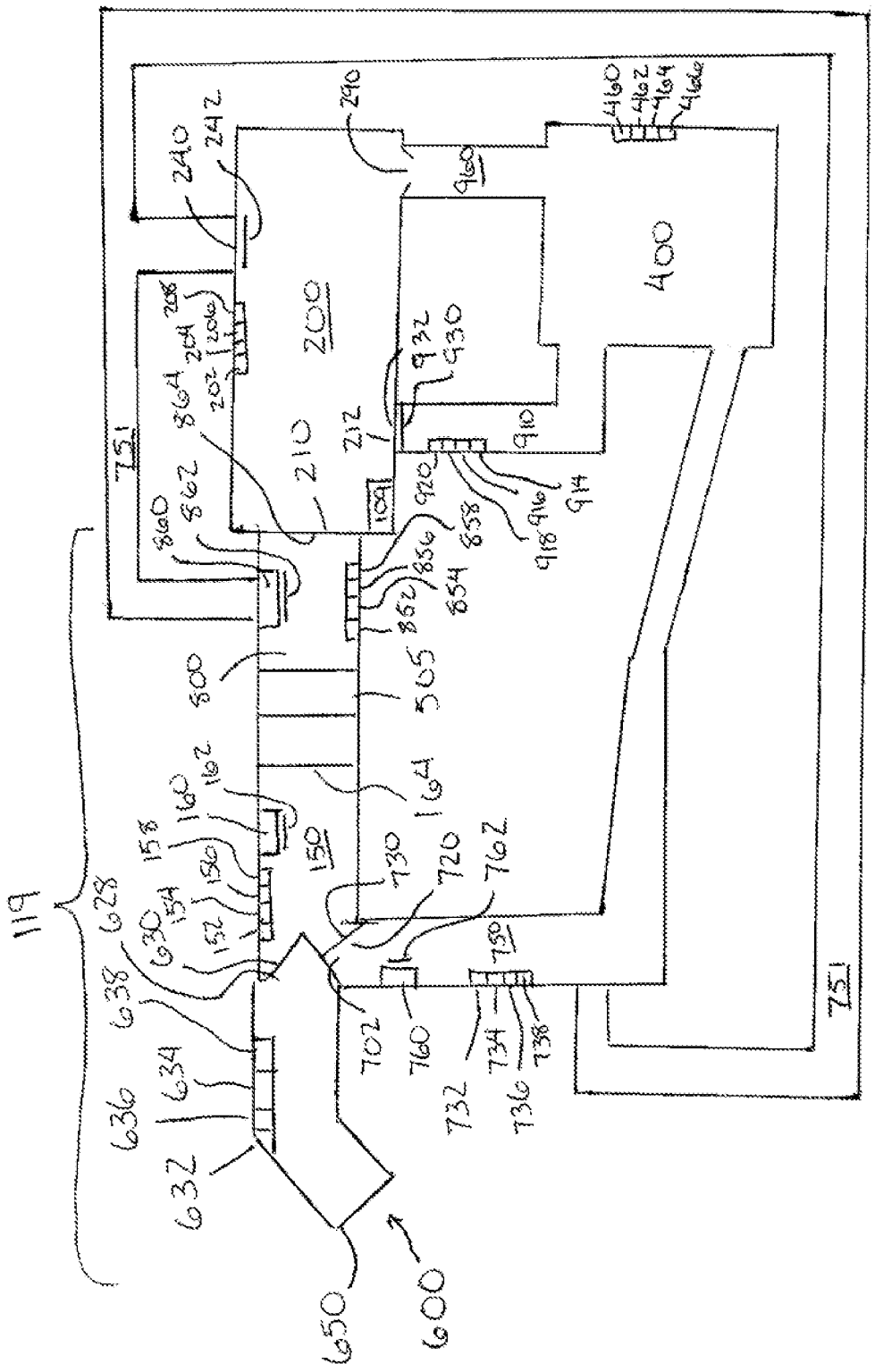
FIG. 8 shows various aspects for HEPA air filter for an air handler made according to the present invention, as set forth below.

The air inlet 101 has been modified from a single inlet unit (see, FIGS. 5, 6, and 7) to a dual inlet unit having a fresh air inlet 600 and a return air inlet 702 as illustrated at FIG. 8. The fresh air inlet 600 receives and directs fresh air taken from the outside environment into a first chamber 150 and the return air inlet 702 directs return air from a first return duct 750 into the first chamber 150.

The fresh air inlet 600 has a fresh air aperture 650 that permits air to enter the fresh air inlet 600. Once the fresh air enters the fresh air inlet 600, the fresh air is measured by a fresh air sensor system that is illustrated as a fresh air temperature sensor 632, a fresh air $CO_2$ sensor 634, a fresh air humidity sensor 636, and a fresh air quantity and quality (particulate count and size) sensor 638. Alternatively, the sensor system could have one sensor measure one, two, three or all four above-identified air characteristics and when the one sensor measures three or less of the above-identified air characteristics, then other sensor(s) measure the remaining above-identified air characteristics. The measurements from the fresh air sensor system 632, 634, 636, 638 are transmitted to a controller 109. Prior to the fresh air entering the first chamber 150 and after the fresh air has been measured by the fresh air sensor system—fresh air temperature sensor 632, the fresh air $CO_2$ sensor 634, the fresh air humidity sensor 636, and the fresh air quantity and quality (particulate count and size) sensor 638—, the fresh air inlet 600 has a variable position fresh air damper 630 positioned before a fresh air inlet aperture 628—that permits fresh air to enter the first air chamber 150. The adjustable, variable-positioned fresh air damper 630 is operationally controlled by the controller 109 positioned in (a) the HEPA air filtration device 119, (b) the air handling device 200, (c) somewhere in the building that the air handling device 200 delivers air into, or (d) remotely located from the building that the air handling device 200 delivers air into, the air handling device 200 and the HEPA air filtration device 119, The controller 109 determines when and how much fresh air is introduced, from the outside environment through the fresh air inlet 600, into the first chamber 150 of the dual inlet HEPA air filtration device 119 based on various fresh air sensor measurements when compared to (a) desired air conditions set forth as first predetermined threshold values and preferred second predetermined threshold values and (b) return air sensor measurements to decrease, and preferably avoid, the formation of ice and water in the first chamber when the return air and the fresh air are mixed in the first chamber.

Similarly, the return air inlet 702 has a first return air aperture 720 that directs return air into the first chamber 150 from the first return duct 750. Prior to the return air entering the first chamber 150 through the first return air aperture 720, the return air in the first return duct 750 has to be able to pass by a first return air damper 730, Within the first return duct 750 and prior to the return air reaching the first return air damper, the return air is measured by a first return sensor system such as a first return air temperature sensor 732, a first return air $CO_2$ sensor 734, a first return air humidity sensor 736, and a first return air quantity and quality (particulate count and size) sensor 738. The adjustable, variable position return air damper 730 is operated by the controller 109. The controller 109 determines when and how much return air is introduced, from the first return air inlet 702, into the first chamber 150 of the dual inlet HEPA air filtration device 119 based on the various return air sensor measurements when compared to (a) desired air conditions set forth as first predetermined threshold values and preferred second predetermined threshold values and (h) fresh air sensor measurements to decrease and preferably avoid the formation of ice and water in the first chamber when the return air and the fresh air are mixed in the first chamber in most climates that the HEPA air filtration unit and the air handling device operate.

Figure 9:
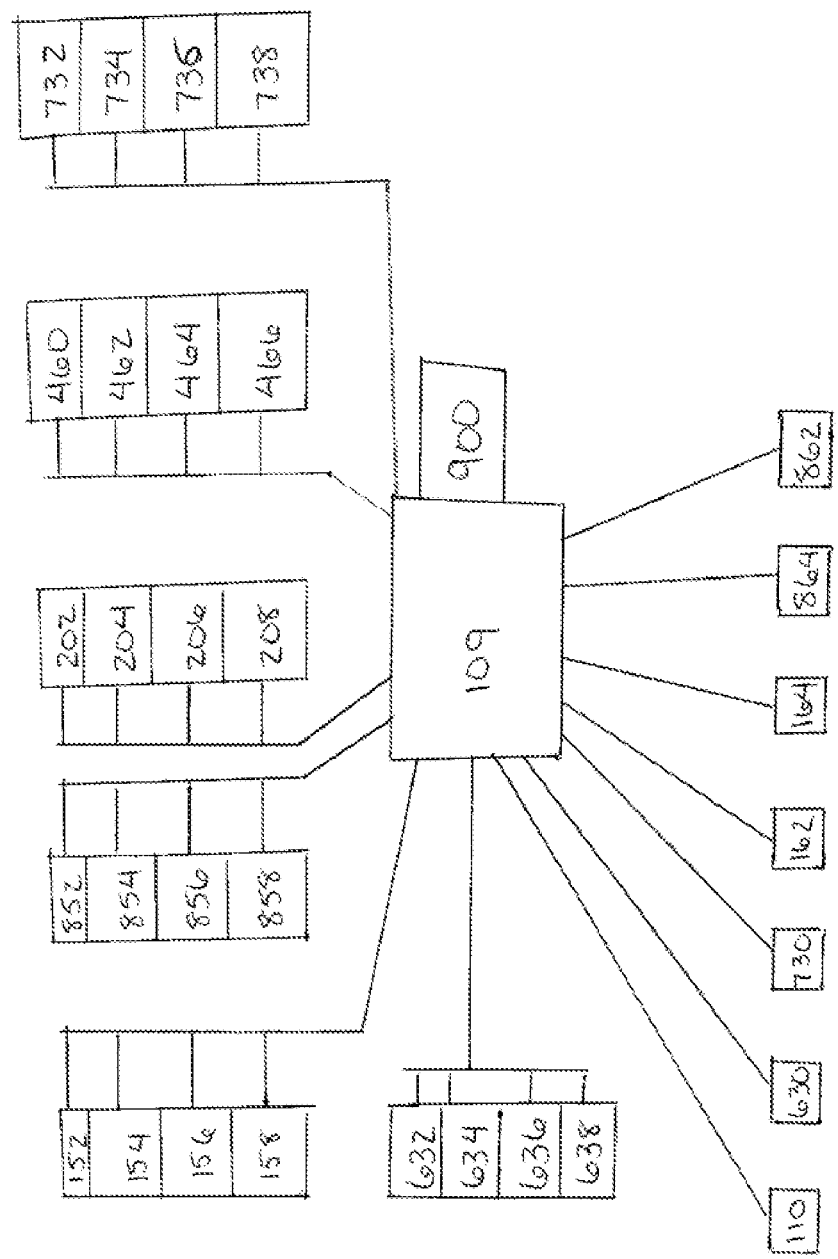
FIG. 9 is a chart illustrating how the controller manages the current invention.
Figure 10:
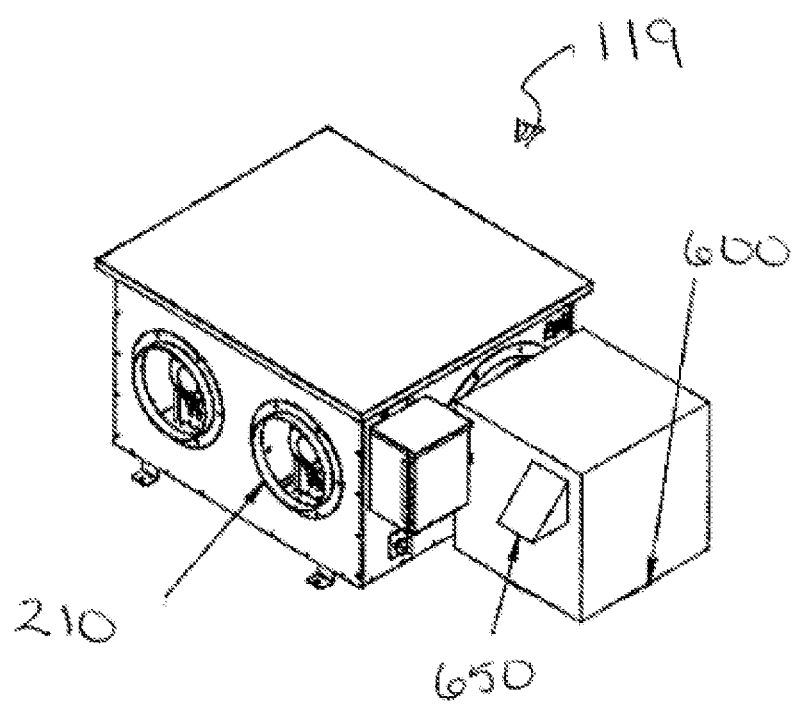
FIG. 10 illustrates the HEPA air filtration system.

In relation to controlling the operation of the variable position fresh air damper 630 and the variable position return air damper 730 as illustrated at FIGS. 8 and 9, controller 109 receives and analyzes (a) measurements from, respectively, the fresh air sensor system that includes the fresh air temperature sensor 632 that measures the fresh air's temperature; the fresh air $CO_2$ sensor 634 that measures the amount of $CO_2$ in the fresh air, the fresh air humidity sensor 636 that measures the amount of humidity in the fresh air, and the fresh air quantity and quality (particulate count and size) sensor 638 that measures the air pressure and the amount of fresh air that could enter the first chamber 150 within a predetermined and allotted time frame;

(b) measurements from, respectively, the first return sensor system that includes the first return air temperature sensor 732 that measures the return air's temperature, the first return air $CO_2$ sensor 734 that measures the amount of $CO_2$ in the return air, the first return air humidity sensor 736 that measures the amount of humidity in the return air, and the first return air quantity and quality (particulate count and size) sensor 738 that measures the air pressure and the amount of return air that could enter the first chamber 150 within a predetermined and allotted time frame;

(c) a transmission from an air handling controller 211 that identifies whether the air handling device 200 is operating or not;

(d) measurements from a building or room sensor system that include a building or room temperature sensor 460, a building or room $CO_2$ sensor 462, a building or room humidity sensor 464, and a building or room air pressure sensor 466 positioned in the building or room 400; and (e) data inputted into a room environment control panel device 110, wherein the data inputted can set or adjust
  (i) a first predetermined threshold values regarding every one (preferred) or any of the following air characteristics: temperature (too cold or too hot as determined, set or adjusted by the inputter), $CO_2$ content (too low or too high as determined, set or adjusted by the inputter), air pressure (too high or too low as determined, set or adjusted by the inputter), humidity (too high or too low as determined, set or adjusted by the inputter), and air-borne particulate count/size for air conditions in the dual inlet HEPA air filtration unit 119; and
  (ii) a second predetermined threshold values regarding every one (preferred) or any of the following air characteristics: temperature (too cold or too hot as determined, set or adjusted by the inputter), $CO_2$ content (too cold or too hot as determined, set or adjusted by the inputter), air pressure (too cold or too hot as determined, set or adjusted by the inputter), humidity (too cold or too hot as determined, set or adjusted by the inputter) for the room and/or building 400; and particulate and particulate size in the air with the understanding that the second predetermined threshold values are the preferred air characteristics in relation to the first predetermine threshold values.

The inputted data defines parameters, according to the person or entity entering or inputting the data, regarding a preferred operating air temperature and, optionally, air humidity, and air-borne particulate count/size, and/or $CO_2$ content for the building and/or room that the air handling device 200 is supposed to deliver to that building and/or room. The inputted parameter data is entered or adjusted manually or remotely, and/or stored in a memory storage unit 900; and such data is transmitted to or obtainable by the controller 109 through conventional electrical transmission conduits (not shown). The inputted parameter data that defines the first predetermined threshold for air conditions in the dual inlet HEPA air filtration unit 119 and the second predetermined threshold for preferred air conditions that enter the building and/or room 400 can be, as suggested above, entered or adjusted by an individual, in person or remotely, and/or an entity such as a manufacturer or a utility provider.

After analyzing the above-identified collected and entered data, the controller 109 determines what percentage of the fresh air damper 630 is going to be open or closed to permit fresh air into the first chamber 150 or not permit fresh air into the first chamber 150. If the controller 109 determines there is a significant difference (too hot, too cold, too much humidity, too low humidity, too much fresh air, too little fresh air, too many particulates, too large of particulates, and/or too much $CO_2$) between the fresh air conditions and the predetermined threshold in view of (a) the conditions of the return air and (b) whether the air handling device 200 is operating or not, then controller 109 adjusts the fresh air damper 630 accordingly to permit the desired amount of fresh air into the first chamber 150 to (i) inhibit the formation of the water and ice in the first chamber and (ii) obtain the first predetermined threshold values, or more preferably the second predetermined threshold values in the first chamber.

Similarly, after analyzing the above-identified collected and entered data, the controller 109 determines what percentage of the first return air damper 730 is going to be open to permit return air into the first chamber 150 or not permit return air into the first chamber 150. If the controller 109 determines there is a significant difference (too hot, too cold, too much humidity, too low humidity, too much return air, too little return air, too many particulates, too large of particulates, and/or too much $CO_2$) between the return air conditions and the predetermined threshold in view of (a) the fresh air conditions and (b) whether the air handling device 200 is operating or not, then controller 109 adjusts the first return air damper 730 accordingly to permit the desired amount of return air into the first chamber 150 to (i) inhibit the formation of the water and ice in the first chamber and (ii) obtain the first predetermined threshold values, or more preferably the second predetermined threshold values in the first chamber.

Not permitting return air into the first chamber 150 is accomplished by exhausting return air through return exhaust opening 760. The controller 109 (a) controls how open, partially open or closed a return exhaust damper 762 is wherein it is understood that the return exhaust damper 762 is positioned, in a closed position, to inhibit return air to exhaust through the return exhaust outlet 760, and (b) alters the position of the return exhaust damper 762 on whether the controller 109 determines if the return air's quality and quantity does or does not meet minimum or exceeds maximum requirements of the first predetermined threshold parameter(s): temperature, humidity, air pressure, too many particulates, too large of particulates, and/or $CO_2$ content. If the filtered air's quality meets the first predetermined threshold parameter(s), then the return air should not be exhausted through the return exhaust outlet 760. On the contrary, if the return air's quality does not meet the first predetermined threshold parameter(s), then the return air should be exhausted through the return exhaust outlet 760 to (i) inhibit the formation of the water and ice in the first chamber and (ii) obtain the first predetermined threshold values, or more preferably the second predetermined threshold values in the first chamber.

In the first chamber 150, the fresh air from the fresh air inlet 600 and the return air from the return air inlet 702, as illustrated at FIG. 8, intermingle to form combined or mixed air. Due to controlling the quantity of fresh air and return air into the first chamber 150, the return air pre-heats, pre-cools, and/or alters the fresh air's humidity toward an acceptable, as measured through a first chamber sensor system that includes a first chamber air temperature sensor 152 that measures the combined air's temperature, a first chamber air $CO_2$ sensor 154 that measures the amount of $CO_2$ in the combined air, a first chamber air humidity sensor 156 that measures the amount of humidity in the combined air, a first chamber air quantity and quality (particulate count and size) sensor 158 that measures the amount of combined air and air-borne particulates that could enter a HEPA filter system 505 and the controller 109, in relation to the first predetermined threshold in order to decrease the chance that the combined air's temperature and humidity will damage the HEPA filter system 505. Such quantity control in relation to the measured temperature, measured humidity and measured $CO_2$ levels is necessary to inhibit the destruction of the HEPA filter system 505 by ice or water formation and simultaneously provide the desired air quality to the building and/or room. In any case, the combined air is drawn toward, but not automatically into, the HEPA filter system 505.

In the first chamber 150, the combined air is designed to pre-heat and/or control the humidity of the fresh air when the fresh air is cooler and/or has too little or much humidity than the predetermined threshold; and alternatively pre-cool and/or control the humidity of the fresh air when the fresh air is warmer and/or has too little or much humidity than the predetermined threshold; and simultaneously decrease the $CO_2$ content in the return air of the combined air. Controlling the conditions of the combined air prior to contacting any component of the HEPA filtration system 505 and the air handling device 200 reduces the chance of shocking or damaging the system 505 and the device 200 with excessive heat differentials and/or high humidity conditions.

If the first chamber's combined air quality does not meet minimum or exceeds maximum requirements for temperature, humidity, air pressure, air-borne particulate count/size, and/or $CO_2$ content that are identified by the first predetermined threshold parameter(s) that are measured by the first chamber sensor systems that include the first chamber air temperature sensor 152, the first chamber air $CO_2$ sensor 154, the first chamber air humidity sensor 156, and the first chamber air quantity and quality (particulate count and size) sensor 158, and the first chamber sensor measurements are transmitted to the controller 109, the controller 109 compares the received first chamber sensor measurements to the first predetermined threshold parameters, and if the controller 109 determines the first chamber's combined air quality does not meet minimum or exceeds maximum requirements of the first predetermined threshold parameter(s): temperature, humidity, air pressure, air-bore particulate count/size and/or $CO_2$ content, then the controller 109 can permit at least a quantity of the first chamber's combined air to be exhausted to the environment through a first exhaust outlet 160. The controller 109 (*a*) controls how open, partially open, or closed a first exhaust damper 162 is, wherein the first exhaust damper 162 is positioned, in a closed position, to inhibit combined air to exhaust through the first exhaust outlet 160, and (b) alters the position of the first exhaust damper 162 on whether the controller 109 determines if the first chamber's combined air quality does, partially does, or does not meet minimum or exceeds maximum requirements of the first predetermined threshold parameter(s): temperature, humidity, air pressure, air-borne particulate count/size and/or $CO_2$ content. If the combined air's quality meets the first predetermined threshold parameter value(s), then the combined air should not be exhausted through the first exhaust outlet 160.

To minimize damage to the HEPA filter system 505, the first chamber 150 has a HEPA damper 164. The HEPA damper 164 (*a*) is positioned between the filter system 505 and the first chamber 150, and (b) can work in conjunction with the first exhaust damper 162. When the first exhaust damper 162 is open to permit the combined air to exhaust through the first exhaust outlet 160, the HEPA damper 164 is closed to inhibit the combined air to contact the HEPA filter system 505. Likewise, when the first exhaust damper 162 is closed to inhibit the combined air to exhaust through the first exhaust outlet 160, the HEPA damper 164 is open to permit the combined air to pass through and be filtered by the REM filter system 505.

Once the combined air passes through the HEPA filter system 505, the combined air becomes filtered air. The filtered air is initially in a second chamber 800. The second chamber 800, similar to the first chamber 150, has a second chamber sensor system such as a second chamber air temperature sensor 852 that measures the filtered air's temperature, a second chamber air $CO_2$ sensor 854 that measures the amount of $CO_2$ in the filtered air, a second chamber air humidity sensor 856 that measures the amount of humidity in the filtered air, a second chamber air quantity and quality (particulate count and size) sensor 858 that measures the amount of filtered air and air borne-particulates/size that could enter the air handling device 200. The second chamber 800, similar to the first chamber 150, also has (a) a second chamber exhaust outlet 860 with a second chamber exhaust damper 862 and (b) an air handling damper 864.

If the second chamber's filtered air quality does not meet minimum or exceeds maximum requirements regarding temperature, humidity, air pressure, air-borne particulate count/size and/or $CO_2$ content that are identified by the second predetermined threshold parameter(s), wherein:

(a) the temperature, humidity, air pressure and/or $CO_2$ are measured by the second chamber sensor system—for example and not limited to the second chamber air temperature sensor 852, the second chamber air $CO_2$ sensor 854, the second chamber air humidity sensor 856, and the second chamber air quantity and quality (particulate count and size) sensor 858,—, (b) those second chamber sensor measurements are transmitted to the controller 109, (c) the controller 109 compares the received second chamber sensor measurements to the second predetermined threshold parameters, and (d) the controller 109 determines if the second chamber's filtered air quality does or does not meet minimum or exceeds maximum requirements of the second predetermined threshold parameter(s) regarding temperature, humidity, air pressure, air-home particulate count/size and/or $CO_2$ content, then the controller 109 permits the second chamber's filtered air to be exhausted to secondary return duct 751 through the second chamber exhaust outlet 860 and the second chamber exhaust damper 862. The secondary return duct 751 returns the partially cleaned filtered air or conditioned filtered air to the return 750 to repeat the above-identified process. The controller 109 (*a*) controls how open, partially open, or closed the second chamber exhaust damper 862 is wherein the second chamber exhaust damper 862 is positioned, in a closed position, to inhibit filtered air to exhaust through the second chamber exhaust outlet 860, and (b) alters the position of the second chamber exhaust damper 862 on whether the controller 109 determines if the second chamber's filtered air quality does or does not meet minimum or exceeds maximum requirements of the second predetermined threshold parameter(s): temperature, humidity, air pressure, air-borne particulate count/size and/or $CO_2$ content. Thus, when the filtered air's quality meets the second predetermined threshold parameter(s), then the filtered air should not be exhausted through the second chamber exhaust outlet 860. On the contrary, if the filtered air's quality does not meet the second predetermined threshold parameter(s), then the filtered air or a portion of the filtered air in the second chamber 800, as determined by the controller 109, should be exhausted through the second exhaust outlet 860.

To minimize damage to the air handling device 200, the second chamber 800 has an air handling damper 864. The air handling damper 864 (*a*) is positioned between the second chamber 800 and the air handling device 200, and (b) works in at a partial conjunction with the second exhaust damper 862. When the second chamber exhaust damper 862 is fully open to permit the filtered air to exhaust through the second chamber exhaust outlet 860, the air handling damper 864 could be closed to inhibit the filtered air to contact the air handling device 200. Likewise, when the second chamber exhaust damper 862 is closed to inhibit the filtered air to exhaust through the second exhaust outlet 860, the air handling damper 864 could be open to permit the filtered air to pass through and be handled by the air handling device 200. However, when the second chamber exhaust damper 862 is partially open to permit at least a desired percentage of the filtered air to exhaust through the second chamber exhaust outlet 860, the air handling damper 864 could be (a) partially open to permit a percentage of the filtered air to enter the air handling device 200 or (b) completely closed to inhibit the filtered air to contact the air handling device 200.

The air handling device 200 operates conventionally to distribute filtered air at its preferred temperature, humidity, volume, air-borne particulate count/size, and pressure to the room/building 400 through an aperture 290 that directs the filtered, conditioned air into supply air duct 960 and the room/building 400.

Alternatively, the air handling system 200 can permit, in normally undesirable circumstances, additional return air to mix with the filtered air through a second return duct 910 having a second return duct sensor systems—a second return duct air temperature sensor 914, a second return duct air $CO_2$ sensor 916, a second return duct air humidity sensor 918, and a second return duct air quantity and quality (particulate count and size) sensor 920—, a second return duct opening 930, interconnected to the controller 109 and a second return duct damper 932—also interconnected to the controller 109. As a result of the chance of unfiltered return air in the air handling system 200, there is a need to monitor the air pressure, temperature, $CO_7$ levels, and humidity in the air handling system 200 through an air handling sensor system such as an air handling air temperature sensor 202 that measures the air temperature in the air handling system 200, an air handling air $CO_2$ sensor 204 that measures the amount of $CO_2$ in the air handling system 200, an air handling air humidity sensor 206 that measures the amount of humidity in the air in the air handling system 200, an air handling air quantity and quality (particulate count and size) sensor 208 that measures the amount of air that could enter the room 400. The air handling sensor system is positioned in the air handling system 200. The measurements from the plurality of corresponding sensors are transmitted to the controller 109.

Controlling the amount of return air that enters directly into the air handling system 200 is similar to controlling the amount of return air that enters the first chamber 150. The air inlet 201 is a dual inlet unit having a filtered air inlet 210, described above, and a second return air inlet 212 as illustrated at FIG. 8. The second return air inlet 212 has a first return air aperture 220 that directs return air into the air handling system 200 from the second return duct 910. Prior to the return air entering the air handling system 200 through the second return air aperture 220, the return air in the second return duct 910 has to be able to pass by a second return air damper 930. Within the second return duct 910 and prior to the return air reaching the second return air damper, the return air is measured by the second return sensor system. The adjustable, variable position second return air damper 930 is operated by the controller 109. The controller 109 determines when and how much return air is introduced, from the second return air inlet 910, into the air handling system 200 of the dual inlet air handling system 200 based on the various second return air sensor measurements when compared to (a) desired air conditions set forth as the first predetermined threshold values and the preferred second predetermined threshold values and (b) filtered air sensor measurements to avoid the formation of ice and water in the air handling system 200 when the return air and the filtered air are mixed in the air handling system 200 in most climates that the HEPA air filtration unit and the air handling device operate.

The air handling system 200 also has an air handling exhaust opening 240 and a corresponding air handling damper 242 wherein the air handling damper is interconnected to the controller 109. The air handling damper functions and operates in the same manner as the first chamber exhaust damper 162 to avoid the formation of ice and/or water in the air handling device 200. The numerous above-identified exhaust systems directs some undesired air toward the secondary return duct 751 in order not to over-pressurize the building and/or room 400; remove undesirable air conditions from entering the building or room; and inhibit the formation of water and ice in the air handling device 200.

The above-identified dual inlet HEPA air filtration system 119 and air handling device in connection with the controller 109, various dampers and sensors are effective in controlling the air flow through the HEPA air filtration system/air handling system without causing undue water condensation, ice, snow, or water buildup in the HEPA filter system 505 and the air handling device 200 in order to significantly decrease damage to the HEPA filter system 505 and the air handling device 200.

It is also understood that each sensor system in each area—fresh air inlet, return air inlet, first chamber, second chamber, air handling device and building/room—can be (a) separate four sensors as illustrated or (b) some or all of the identified sensors can be can be combined to form one, two or three sensors. In addition, it is understood that each sensor system in each area—fresh air inlet, return air inlet, first chamber, second chamber, rooftop air handling device and building/room—can measure one, two, three or all four of the following air characteristics: air pressure, $CO_2$ levels, humidity and temperature. It is preferred that each sensor system measures all four air characteristics.

Alternatively, as illustrated at FIGS. 10 to 13, the air filtration unit 119 can have a box-like fresh air inlet 600 having the fresh air aperture 650 interconnected to the first chamber 150. The first chamber 150 has a top wall 310 having an air sealing material 312 (that also defines a portion of the second chamber 800), a removeable back wall 312 with a sealing material with hook areas that interconnect to latches 314 positioned on both side walls 330 (that also define a portion of the second chamber 800), a bottom wall 332 with air sealing material (that also defines a portion of the second chamber 800), and an intermediate wall 334 with air sealing materials facing the first chamber 150 and the second chamber 800. The dampers and walls are supported by brackets 340. There is also a removeable front wall 313 (see FIG. 13) with air sealing material that defines the front portion of the second chamber 800. As illustrated, each set of sensors—for example, 632, 634, 636, and 638—can be wirelessly connected to the controller 900.

Although the preferred embodiment has been described in detail, it should be understood that various changes, substi-

The invention claimed is:

1. A HEPA/VOC air handling system comprising:
   a HEPA air filtration unit having
   (a) a first chamber,
   (b) a second chamber,
   (c) a fresh air inlet that directs selected quantities of fresh air into the first chamber,
   (d) a return air inlet that directs selected quantities of return air into the first chamber,
   (e) the fresh air and the return air are mixed together in the first chamber to form mixed air,
   (f) a HEPA filter capable of receiving the mixed air and directs filtered air into the second chamber;
   an air handling unit having
   (a) a filtered air intake capable of receiving the filtered air,
   (b) a heat exchanger and/or a desiccant exchanger, and
   (c) an outlet capable of directing the conditioned filtered air toward at least a room in a building;
   a fresh air sensor system (a) positioned in the fresh air inlet, and (b) has (i) a first fresh air sensor that measures air pressure, a second fresh air sensor that measures $CO_2$ levels, a third fresh air sensor that measures humidity and a fourth fresh air sensor that measures temperature; or (ii) has at least one fresh air sensor that measures at least two air characteristics selected from the group consisting of air pressure, $CO_2$ levels, humidity and temperature and those air characteristics not measured by the at least one fresh air sensor are measured by a second fresh air sensor or a second fresh air sensor and a third fresh air sensor;
   a return air sensor system (a) positioned in the return air inlet, and (b) has (i) a first return air sensor that measures air pressure, a second return air sensor that measures $CO_2$ levels, a third return air sensor that measures humidity and a fourth return air sensor that measures temperature; or (ii) has at least one return air sensor that measures at least two air characteristics selected from the group consisting of air pressure, $CO_2$ levels, humidity and temperature and those air characteristics not measured by the at least one return air sensor are measured by a second return air sensor or a second return air sensor and a third return air sensor;
   an air handling air sensor system (a) positioned in the air handling unit, and (b) has (i) a first air handling air sensor that measures air pressure, a second air handling air sensor that measures $CO_2$ levels, a third air handling air sensor that measures humidity and a fourth air handling air sensor that measures temperature; or (ii) has at least one air handling air sensor that measures at least two air characteristics selected from the group consisting of air pressure, $CO_2$ levels, humidity and temperature and those air characteristics not measured by the at least one air handling air sensor are measured by a second air handling air sensor or a second air handling air sensor and a third air handling air sensor;
   a controller
   (a) capable of receiving the measurements transmitted from the fresh air sensor system, the return air sensor system, and the air handling air sensor system;
   (b) capable of receiving a confirmation signal that confirms whether the air handling unit is operating or not,
   (c) evaluates the measurements from the fresh air sensor system, and the return air sensor system, to first predetermined threshold parameter values regarding air pressure, $CO_2$ levels, humidity and temperature and when every measurement from the fresh air sensor system is within the first predetermined threshold parameter values, then the controller permits a fresh air inlet damper to at least partially open to permit a calculated amount of fresh air to enter into the first chamber;
   when every measurement from the return air sensor system is within the first predetermined threshold parameter values, then the controller permits a return air inlet damper to open to at least partially permit a calculated amount of return air to enter into the first chamber;
   wherein the calculated amount of return air and the calculated amount of fresh air entering into the first chamber collectively (a) will decrease the chance of over-pressurizing or under-pressurizing the room, and (b) will mix to increase a chance that air pressure, $CO_2$ levels, humidity, and temperature of the mixed air will be within or move toward second predetermined threshold parameter values regarding air pressure, $CO_2$ levels, humidity and temperature;
   when at least one measurement from the return air sensor system is outside the first predetermined threshold parameter values, then the controller opens a return air inlet exhaust damper to permit a desired quantity of return air to exhaust from the HEPA/VOC air handling system;
   (d) evaluates the measurements of the air handling air sensor system to the second predetermined threshold parameter values regarding the filtered mixed air's air pressure, $CO_2$ levels, humidity and temperature and when every measurement from the air handling air sensor system is within the second predetermined threshold parameter values, then the controller opens a second chamber damper to at least partially permit a measured amount of filtered conditioned mixed air to enter into the room and when at least one measurement from the air handling air sensor system is outside the second predetermined threshold parameter values, then the controller opens an air handling exhaust damper to at least partially permit a desired amount of filtered conditioned air to exhaust from the HEPA/VOC air handling system in order for the remaining filtered conditioned air combined with additional filtered conditioned air to increase a chance the air handling units filtered conditioned air will be within the second predetermined threshold parameter values.

2. The HEPA/VOC air handling system of claim 1 wherein the second predetermined threshold parameter values are adjustable.

3. The HEPA/VOC air handling system of claim 1 wherein the first predetermined threshold parameter values are adjustable.

4. The HEPA/VOC air handling system of claim 1 wherein the air handling unit has a return air damper and the controller permits determined quantity of return air into the air handling unit to inhibit delivering under-pressurized air into the room.

5. The HEPA/VOC air handling system of claim 1 wherein the HEPA filter is a threaded unit.

6. The HEPA/VOC air handling system of claim 1, further comprising
   a room sensor system (a) positioned in the building, and (b) has (i) a first room air sensor that measures air pressure, a second room air sensor that measures $CO_2$ levels, a third room air sensor that measures humidity and a fourth room air sensor that measures temperature; or (ii) has at least one room air sensor that measures at least two air characteristics selected from the group consisting of air pressure, $CO_2$ levels, humidity and temperature and those air characteristics not measured by the at least one room air sensor are measured by a second room air sensor or a second room air sensor and a third room air sensor.

7. The HEPA/VOC air handling system of claim 1, further comprising
a first chamber air sensor system (a) positioned in the first chamber, (b) measures the mixed air's air pressure, $CO_2$ levels, humidity and temperature, and (c) has (i) a first first chamber air sensor that measures air pressure, a second first chamber air sensor that measures $CO_2$ levels, a third first chamber air sensor that measures humidity and a fourth first chamber air sensor that measures temperature; or (ii) has at least one first chamber air sensor that measures at least two air characteristics selected from the group consisting of air pressure, $CO_2$ levels, humidity and temperature and those air characteristics not measured by the at least one first chamber air sensor are measured by a second first chamber air sensor or a second first chamber air sensor and a third first chamber air sensor; and
when the controller evaluates the measurements from the fresh air sensor system, the return air sensor system, and the first chamber air sensor system to first predetermined threshold parameter values regarding air pressure, $CO_2$ levels, humidity and temperature and
when every measurement from the first chamber air sensor system is within the first predetermined threshold parameter values, then the controller, at least partially, opens a first chamber damper to permit a desired amount of mixed air to enter into the HEPA filter to form filtered mixed air and when at least one measurement from the first chamber air sensor system is outside the first predetermined threshold parameter values, then the controller, at least partially, opens a first chamber exhaust damper to permit a measured amount of mixed air to exhaust from the HEPA/VOC air handling system in order for the remaining mixed air combined with additional mixed air to increase a the chance the first chamber's mixed air will be within the first predetermined threshold parameter values.

8. The HEPA/VOC air handling system of claim 7, further comprising
a second chamber air sensor system (a) positioned in the second chamber, (b) measures the filtered air's air pressure, $CO_2$ levels, humidity and temperature, and (c) has (i) a first second chamber air sensor that measures air pressure, a second second chamber air sensor that measures $CO_2$ levels, a third second chamber air sensor that measures humidity and a fourth second chamber air sensor that measures temperature; or (ii) has at least one second chamber air sensor that measures at least two air characteristics selected from the group consisting of air pressure, $CO_2$ levels, humidity and temperature and those air characteristics not measured by the at least one second chamber air sensor are measured by a second second chamber air sensor or a second second chamber air sensor and a third second chamber air sensor.

9. The HEPA/VOC air handling system of claim 8, further comprising
a room sensor system (a) positioned in the building, and (b) has (i) a first room air sensor that measures air pressure, a second room air sensor that measures $CO_2$ levels, a third room air sensor that measures humidity and a fourth room air sensor that measures temperature; or (ii) has at least one room air sensor that measures at least two air characteristics selected from the group consisting of air pressure, $CO_2$ levels, humidity and temperature and those air characteristics not measured by the at least one room air sensor are measured by a second room air sensor or a second room air sensor and a third room air sensor.

10. The HEPA/VOC air handling system of claim 1, further comprising
a second chamber air sensor system (a) positioned in the second chamber, (b) measures the filtered air's air pressure, $CO_2$ levels, humidity and temperature, and (c) has (i) a first second chamber air sensor that measures air pressure, a second second chamber air sensor that measures $CO_2$ levels, a third second chamber air sensor that measures humidity and a fourth second chamber air sensor that measures temperature; or (ii) has at least one second chamber air sensor that measures at least two air characteristics selected from the group consisting of air pressure, $CO_2$ levels, humidity and temperature and those air characteristics not measured by the at least one second chamber air sensor are measured by a second second chamber air sensor or a second second chamber air sensor and a third second chamber air sensor.

11. The HEPA/VOC air handling system of claim 1, wherein the HEPA air filtration unit and the air handling unit are a unitary unit.

12. A HEPA/VOC air handling system comprising:
a HEPA air filtration unit having
(a) a first chamber,
(b) a second chamber,
(c) a fresh air inlet that directs selected quantities of fresh air into the first chamber,
(d) a return air inlet that directs selected quantities of return air into the first chamber,
(e) the fresh air and the return air are mixed together in the first chamber to form mixed air,
(f) a HEPA filter capable of receiving the mixed air and directs filtered air into the second chamber;
an air handling unit having
(a) a filtered air intake capable of receiving the filtered air,
(b) a heat exchanger and/or a desiccant exchanger, and
(c) an outlet capable of directing the conditioned filtered air toward at least a room in a building;
a fresh air sensor system (a) positioned in the fresh air inlet, and (b) has (i) a first fresh air sensor that measures air pressure, a second fresh air sensor that measures $CO_2$ levels, a third fresh air sensor that measures humidity and a fourth fresh air sensor that measures temperature; or (ii) has at least one fresh air sensor that measures at least two air characteristics selected from the group consisting of air pressure, $CO_2$ levels, humidity and temperature and those air characteristics not measured by the at least one fresh air sensor are measured by a second fresh air sensor or a second fresh air sensor and a third fresh air sensor;
a return air sensor system (a) positioned in the return air inlet, and (b) has (i) a first return air sensor that measures air pressure, a second return air sensor that measures $CO_2$ levels, a third return air sensor that measures humidity and a fourth return air sensor that measures temperature; or (ii) has at least one return air sensor that measures at least two air characteristics selected from the group consisting of air pressure, $CO_2$ levels, humidity and temperature and those air characteristics not measured by the at least one return air sensor are measured by a second return air sensor or a second return air sensor and a third return air sensor;

a first chamber air sensor system (a) positioned in the first chamber, (b) measures the mixed air's air pressure, $CO_2$ levels, humidity and temperature, and (c) has (i) a first first chamber air sensor that measures air pressure, a second first chamber air sensor that measures $CO_2$ levels, a third first chamber air sensor that measures humidity and a fourth first chamber air sensor that measures temperature; or (ii) has at least one first chamber air sensor that measures at least two air characteristics selected from the group consisting of air pressure, $CO_2$ levels, humidity and temperature and those air characteristics not measured by the at least one first chamber air sensor are measured by a second first chamber air sensor or a second first chamber air sensor and a third first chamber air sensor;

an air handling air sensor system (a) positioned in the air handling unit, and (b) has (i) a first air handling air sensor that measures air pressure, a second air handling air sensor that measures $CO_2$ levels, a third air handling air sensor that measures humidity and a fourth air handling air sensor that measures temperature; or (ii) has at least one air handling air sensor that measures at least two air characteristics selected from the group consisting of air pressure, $CO_2$ levels, humidity and temperature and those air characteristics not measured by the at least one air handling air sensor are measured by a second air handling air sensor or a second air handling air sensor and a third air handling air sensor;

a controller (a) capable of receiving the measurements transmitted from the fresh air sensor system, the return air sensor system, the first chamber air sensor system, and the air handling air sensor system;

(b) capable of receiving a confirmation signal that confirms whether the air handling unit is operating or not, (c) evaluates the measurements from the fresh air sensor system, the return air sensor system, the first chamber air sensor system to first predetermined threshold parameter values regarding air pressure, $CO_2$ levels, humidity and temperature and when every measurement from the fresh air sensor system is within the first predetermined threshold parameter values, then the controller permits a fresh air inlet damper to at least partially open to permit a calculated amount of fresh air to enter into the first chamber;

when every measurement from the return air sensor system is within the first predetermined threshold parameter values, then the controller permits a return air inlet damper to open to at least partially permit a calculated amount of return air to enter into the first chamber;

wherein the calculated amount of return air and the calculated amount of fresh air entering into the first chamber collectively (a) will decrease the chance of over-pressurizing or under-pressurizing the room, and (b) will mix to increase a chance that air pressure, $CO_2$ levels, humidity, and temperature of the mixed air will be within or move toward second predetermined threshold parameter values regarding air pressure, $CO_2$ levels, humidity and temperature;

when at least one measurement from the return air sensor system is outside the first predetermined threshold parameter values, then the controller opens a return air inlet exhaust damper to permit a desired quantity of return air to exhaust from the HEPA/VOC air handling system;

when every measurement from the first chamber air sensor system is within the first predetermined threshold parameter values, then the controller, at least partially, opens a first chamber damper to permit a desired amount of mixed air to enter into the HEPA filter to form filtered mixed air and when at least one measurement from the first chamber air sensor system is outside the first predetermined threshold parameter values, then the controller, at least partially, opens a first chamber exhaust damper to permit a measured amount of mixed air to exhaust from the HEPA/VOC air handling system in order for the remaining mixed air combined with additional mixed air to increase a the chance the first chamber's mixed air will be within the first predetermined threshold parameter values;

(d) evaluates the measurements of the air handling air sensor system to the second predetermined threshold parameter values regarding the filtered mixed air's air pressure, $CO_2$ levels, humidity and temperature and when every measurement from the air handling air sensor system is within the second predetermined threshold parameter values, then the controller opens a second chamber damper to at least partially permit a measured amount of filtered conditioned mixed air to enter into the room and when at least one measurement from the air handling air sensor system is outside the second predetermined threshold parameter values, then the controller opens an air handling exhaust damper to at least partially permit a desired amount of filtered conditioned air to exhaust from the HEPA/VOC air handling system in order for the remaining filtered conditioned air combined with additional filtered conditioned air to increase a chance the air handling units filtered conditioned air will be within the second predetermined threshold parameter values.

13. The HEPA/VOC air handling system of claim 12 wherein the second predetermined threshold parameter values are adjustable.

14. The HEPA/VOC air handling system of claim 12 wherein the first predetermined threshold parameter values are adjustable.

15. The HEPA/VOC air handling system of claim 12 wherein the air handling unit has a return air damper and the controller permits determined quantity of return air into the air handling unit to inhibit delivering under-pressurized air into the room.

16. The HEPA/VOC air handling system of claim 12 wherein the HEPA filter is a threaded unit.

17. The HEPA/VOC air handling system of claim 12, further comprising a room sensor system (a) positioned in the building, and (b) has (i) a first room air sensor that measures air pressure, a second room air sensor that measures $CO_2$ levels, a third room air sensor that measures humidity and a fourth room air sensor that measures temperature; or (ii) has at least one room air sensor that measures at least two air characteristics selected from the group consisting of air pressure, $CO_2$ levels, humidity and temperature and those air characteristics not measured by the at least one room air sensor are measured by a second room air sensor or a second room air sensor and a third room air sensor.

18. The HEPA/VOC air handling system of claim 12, further comprising
a second chamber air sensor system (a) positioned in the second chamber, (b) measures the filtered air's air pressure, $CO_2$ levels, humidity and temperature, and (c) has (i) a first second chamber air sensor that measures air pressure, a second second chamber air sensor that measures $CO_2$ levels, a third second chamber air sensor that measures humidity and a fourth second chamber air sensor that measures temperature; or (ii) has at least one second chamber air sensor that measures at least two air characteristics selected from the group consisting of air pressure, $CO_2$ levels, humidity and temperature and those air characteristics not measured by the at least one second chamber air sensor are measured by a second second chamber air sensor or a second second chamber air sensor and a third second chamber air sensor.

19. The HEPA/VOC air handling system of claim 12, wherein the HEPA air filtration unit and the air handling unit are a unitary unit.

* * * * *